US007752706B2

United States Patent
Goodger

(10) Patent No.: US 7,752,706 B2
(45) Date of Patent: Jul. 13, 2010

(54) BAGGER ATTACHMENT FOR LEAF BLOWER

(76) Inventor: William H. Goodger, 17 Lauren Ave. South, Dix Hills, NY (US) 11746

( * ) Notice: Subject to any disclaimer, the term of this patent is extended or adjusted under 35 U.S.C. 154(b) by 281 days.

(21) Appl. No.: 12/068,064

(22) Filed: Feb. 1, 2008

(65) Prior Publication Data

US 2008/0295280 A1    Dec. 4, 2008

Related U.S. Application Data

(60) Provisional application No. 60/924,862, filed on Jun. 1, 2007.

(51) Int. Cl.
*A47L 5/00* (2006.01)
*A47L 9/00* (2006.01)
(52) U.S. Cl. .................. 15/327.4; 15/327.6; 15/340.2; 15/347; 15/246.4; 55/429
(58) Field of Classification Search ............... 15/327.1, 15/327.6, 323, 347, 327.4, 340.2, 246.4; 55/429; *A47L 5/00, 9/00*
See application file for complete search history.

(56) References Cited

U.S. PATENT DOCUMENTS

| 2,420,411 | A | * | 5/1947 | Blount, Sr. ................... 220/325 |
| 4,567,623 | A | | 2/1986 | Walton |
| 4,713,858 | A | | 12/1987 | Kelber |
| 5,445,398 | A | | 8/1995 | Pierce |
| 6,170,118 | B1 | * | 1/2001 | McIntyre et al. ........... 15/327.6 |
| D450,166 | S | * | 11/2001 | Skalka ......................... D34/1 |
| 6,574,829 | B1 | * | 6/2003 | Marcum et al. ............... 15/347 |
| 2005/0193517 | A1 | | 9/2005 | Svoboda et al. |

* cited by examiner

*Primary Examiner*—David A Redding
(74) *Attorney, Agent, or Firm*—Richard C. Litman

(57) ABSTRACT

The bagger attachment for a leaf blower has a large container that accommodates full size trash bags. The container is a barrel mounted on a wheeled cart and includes a cover that is hinged to the container and securely closed by a C-clamp. The exhaust conduit of a leaf blower is secured in an aperture in the cover. A filter is mounted on the cover to allow air from the vacuum to escape the container, permitting the collected leaves and debris to remain inside the container. A flexible hose is attached to the suction end of the blower for pulling the leaves and debris into the container. A trash bag is placed in the container. The container also includes a pivoting platform inside the barrel for supporting the trash bag thereon. A door is provided for allowing access to the interior of the container.

16 Claims, 3 Drawing Sheets

BAGGER ATTACHMENT FOR LEAF BLOWER

CROSS-REFERENCE TO RELATED APPLICATION

This application claims the benefit of U.S. Provisional Patent Application Ser. No. 60/924,862, filed Jun. 1, 2007.

BACKGROUND OF THE INVENTION

1. Field of the Invention

The present invention generally relates to vacuum devices, and more particularly, to a bagger attachment for a leaf blower for bagging leaves and other yard debris.

2. Description of the Related Art

Bagging leaves by hand is physically exhausting work. There are air blowers on the market offering bag attachments for capturing leaves and debris with a blower/vacuum system and depositing the leaves and debris into a fabric bag attached to the blower. The blower unit hangs from straps, and the suction tube is stiff and stationary, both of which make the blower unit heavy and difficult to handle. Furthermore, it is a strain carrying the unit, especially if it is a gasoline-driven blower. The bag is small and requires frequent unloading of its contents into a second trash bag. Thus, a bagger attachment for leaf blower solving the aforementioned problems is desired.

SUMMARY OF THE INVENTION

The bagger attachment for a leaf blower has a large container that accommodates full size trash bags. The container is a barrel mounted on wheels and includes a cover that is hinged thereto and securely closed by a C-clamp. The exhaust end of the leaf blower in vacuum mode is secured in an aperture in the cover. A filter is mounted on the cover to allow air from the vacuum to escape the container, permitting the collected leaves and debris to remain inside the container. A flexible hose is attached to the suction end of the blower for pulling the leaves and debris into the container. A trash bag is placed in the container. The mouth of the bag is sealed between the top of the container and the cover for receiving the leaves and debris. The container also includes a pivoting platform inside the barrel, the trash bag resting on the platform. A door is provided for allowing access to the interior of the container to pivot the platform out of the container for removal of the trash bag when it is full.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
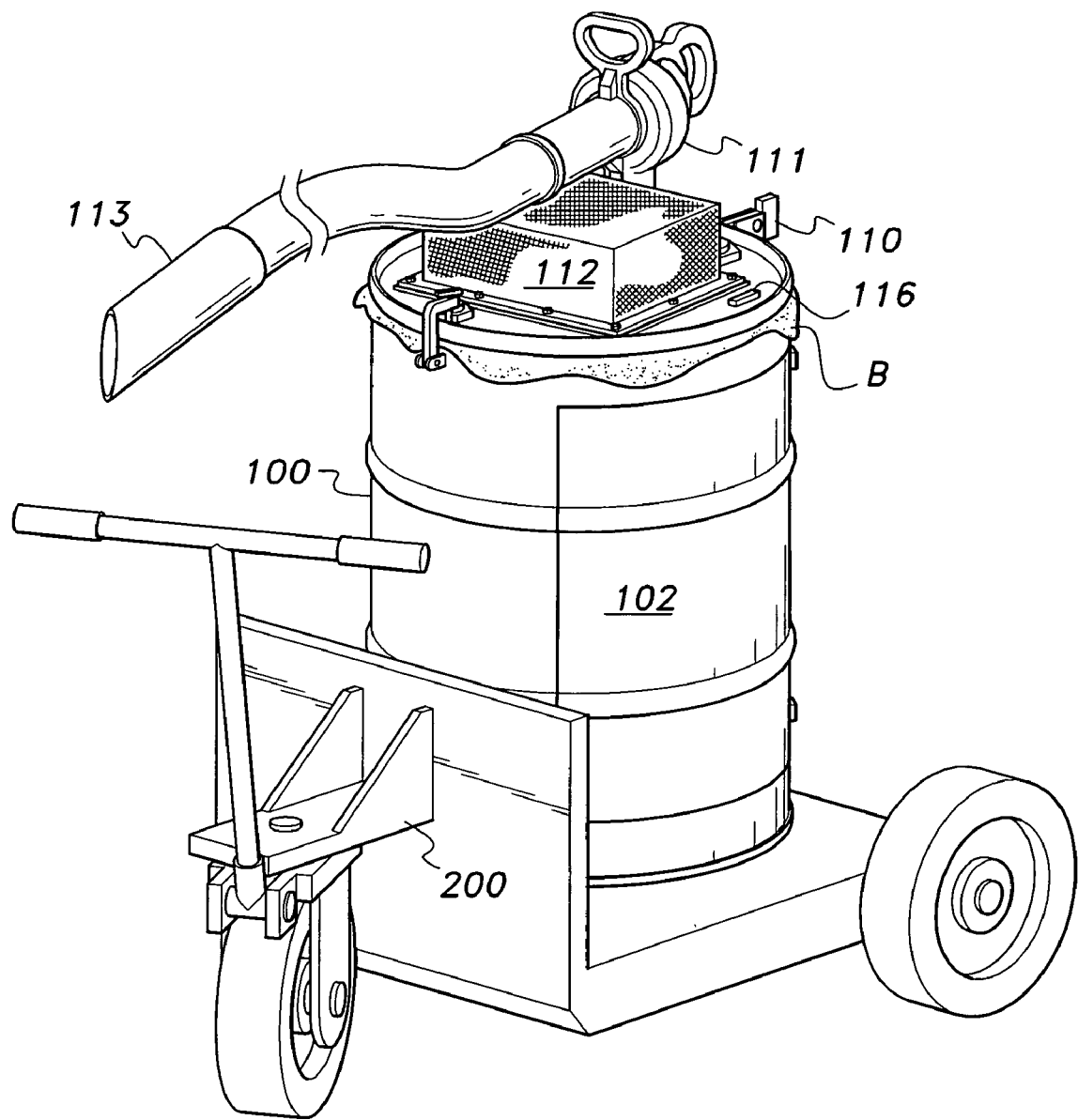
FIG. 1 is a perspective view of a bagger attachment for a leaf blower according to the present invention.
Figure 2:
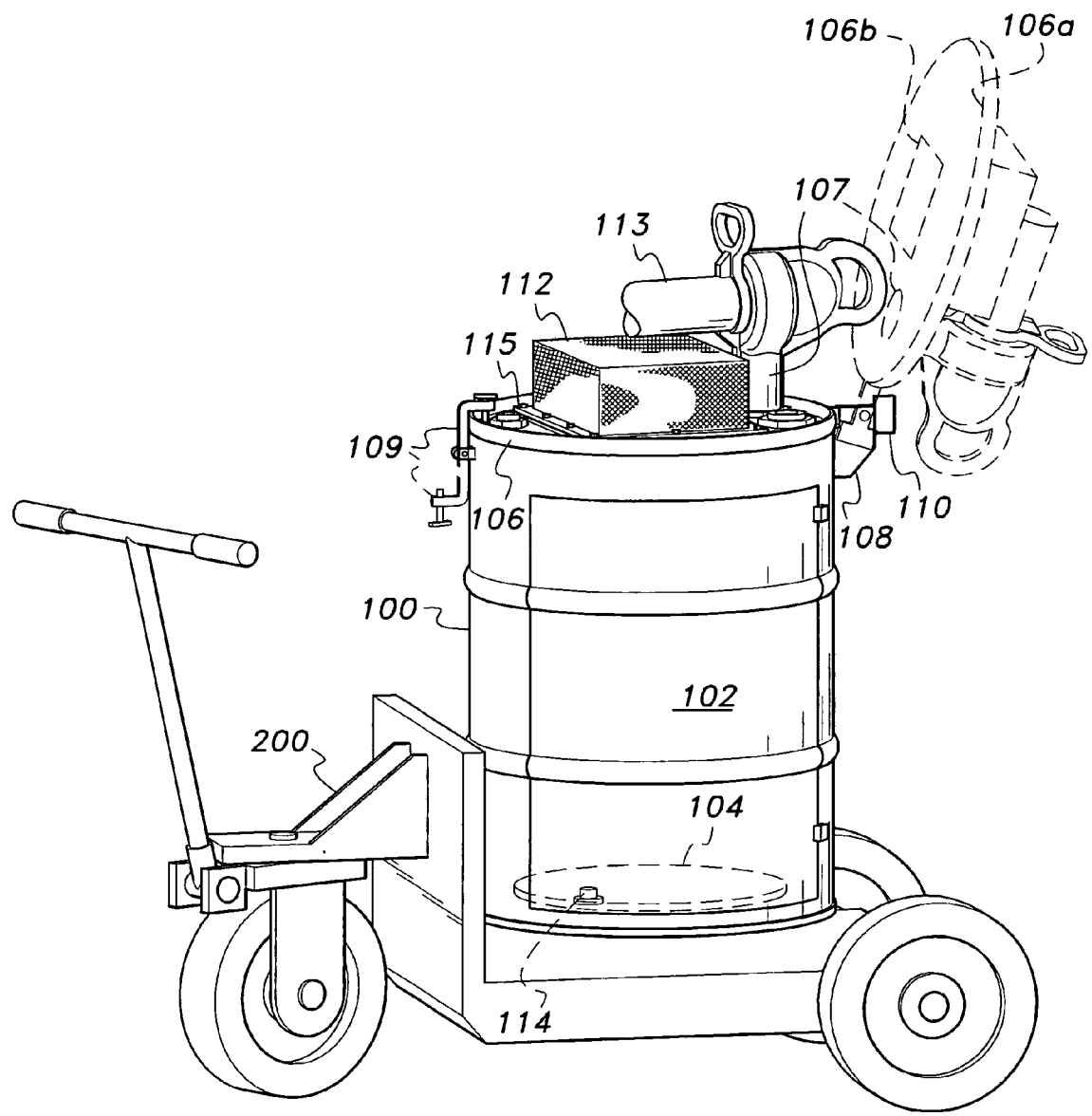
FIG. 2 is a perspective view of the bagger attachment for a leaf blower according to the present invention, showing the cover pivoted to an open position.

The present invention is a bagger attachment for a leaf blower. The bagger attachment has a large container that accommodates a full size trash bag. As shown in FIGS. 1 and 2, the container 100 is a barrel of plastic, aluminum or steel construction that is about twenty-four inches in diameter and thirty-four inches in height, or other convenient dimensions for accommodating a trash bag of sufficient volume to contain leaves and other yard waste. The container 100 includes a cover 106 that is hinged on one side of the container by a hinge 108. A C-clamp 109 securely closes the opposite side of cover 106. The cover 106 has an outer lip 106a defining a groove that goes over the top rim of the container 100. A rubber gasket is seated in the groove and seals against the top edge of the container 100, trapping the mouth B of the trash bag and forming a tight seal. The mouth of the trash bag is secured between the top end of the container 100 and the closed cover 106. A counterweight 110 is provided on the hinged side of cover 106 to balance the weight of the cover 106.

The exhaust outlet duct of a leaf blower 111, when operated in vacuum mode, is removably secured to the cover 106. A diffuser tube 107 extends through the cover 106, the diffuser tube 107 being of frustoconical configuration and having its smaller diameter end oriented to receive the blower duct and its larger diameter end opening into container 100 and extending below the cover 106. This arrangement functions to reduce the entry velocity of air, leaves, and debris blown into the container by blower 111. The blower 111 can be snapped out and used as a leaf blower in normal fashion and snapped back into the diffuser tube 107 for bagging leaves when the blower 111 is operated in vacuum mode. The diffuser tube 107 is pivotally mounted to the cover 106 to allow the blower 111 to swivel freely.

A box-shaped filter 112 is also placed over an opening 106b in the cover 106 to allow air blown into the container 100 from the exhaust outlet of the blower 111 to escape the container 100, allowing the leaves and debris to remain within the container. The filter 112 is made from a scrim fiber fabric that is installed between flanges 115 on both sides of the cover 106.

Figure 3:
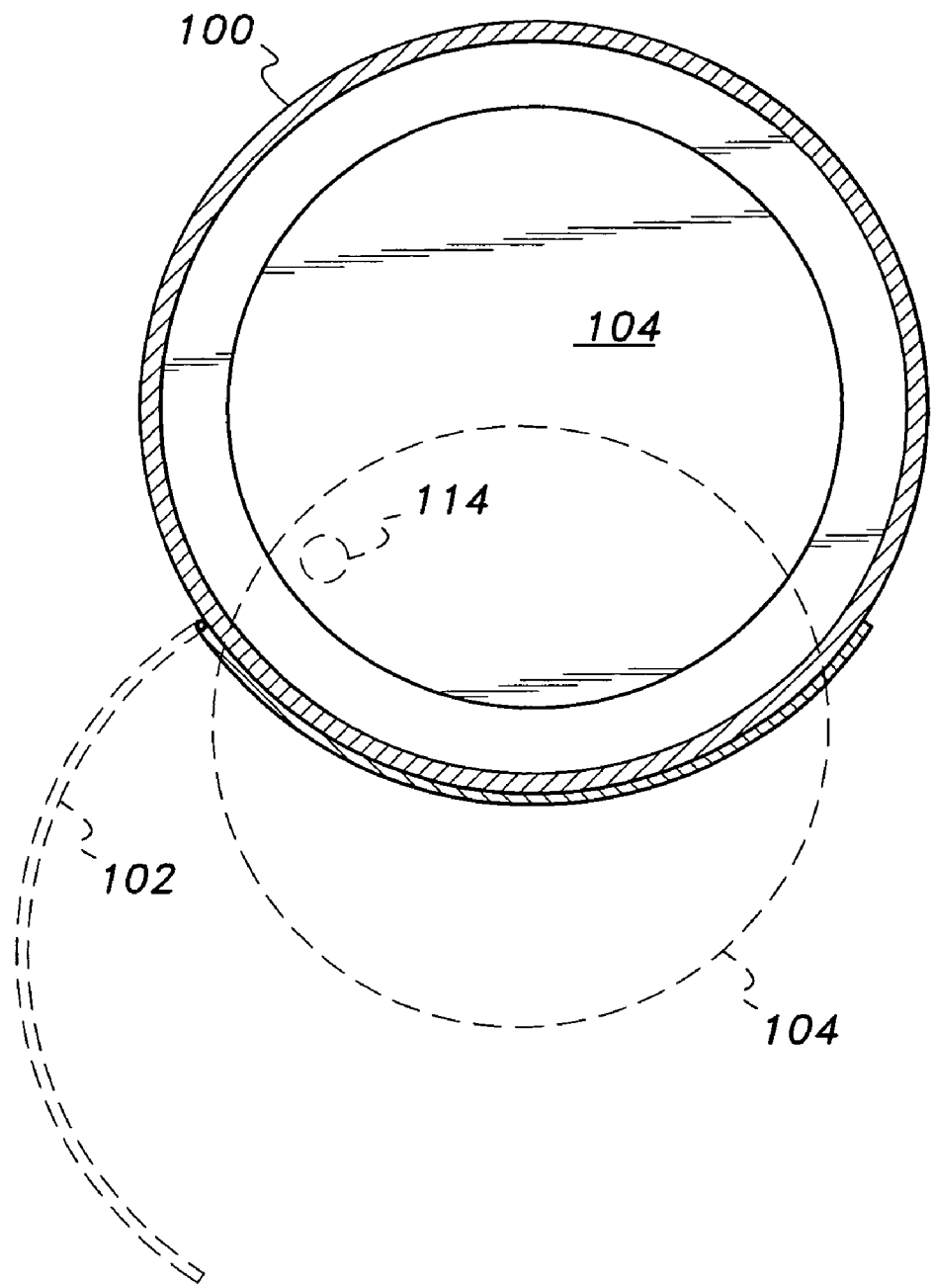
FIG. 3 is a transverse section view through the container of the bagger attachment for a leaf blower according to the present invention, showing pivoting of the platform through the open door in the side of the container in phantom lines.

A flexible, lightweight, wire-wound hose 113 is attached to the suction inlet of the blower 111 for pulling the leaves and debris into the container 100. As best seen in to FIG. 3, the container 100 also includes a platform 104 pivotally mounted on a support column 114 at the bottom of container 100. The trash bag rests on the platform 104. A hinged door 102 is provided in the side of the container 100 for allowing access to the interior of the container 100. When the cover 106 and the door 102 are open, the platform 104 can be pivoted out of the container 100 so that the trash bag can be removed and tied up when it is full. The container 100 is mounted upon a three-wheeled cart 200 or otherwise supported on wheels to allow movement of the container 100 about a yard.

The cover 106 may include a pressure relief valve 116 mounted therein for relieving pressure in the container 100 in case the filter 112 becomes blocked by leaves or debris.

It is to be understood that the present invention is not limited to the embodiment described above, but encompasses any and all embodiments within the scope of the following claims.

I claim:

1. A bagger attachment for a leaf blower, the bagger attachment comprising:

a container dimensioned and configured for supporting a yard waste refuse bag, the container having an open top, wherein said container has an opening formed in a vertical wall thereof, the bagger attachment further comprising a movable door positioned over the opening formed in the vertical wall of said container, further wherein said container has a bottom wall, the bagger attachment further comprising a platform pivotally mounted on said bottom wall, whereby said door may be opened and the platform pivoted in order to remove the refuse bag when full;

a cover pivotally attached to the container, the cover having a filter opening defined therein;

a clamp mounted on the container, the clamp releasably latching the cover in a closed position covering the open top of the container and clamping a mouth of the refuse bag between the cover and the top of the container;

a diffuser tube extending through the cover, the diffuser tube having a narrow diameter end extending above the cover, the narrow diameter end being adapted for snapping a leaf blower thereto, the diffuser tube having an opposite wide diameter end extending below the cover for reducing debris and air velocity of the debris and air blown into the container by the leaf blower when operated in vacuum mode with the cover in the closed position; and a filter placed over the filter opening for allowing air blown into the container by the leaf blower to escape the container while leaving the leaves and debris collected within the refuse bag.

2. The bagger attachment according to claim 1, further including a hinge attached to said cover and said container for pivotally attaching said cover to said container.

3. The bagger attachment according to claim 2, further comprising a counterweight attached to said cover adjacent said hinge for balancing weight attached to said cover.

4. The bagger attachment according to claim 1, further including a wheeled cart, said container being supported on the wheeled cart.

5. The bagger attachment according to claim 1, further comprising a lightweight, wire-wound, flexible hose adapted for attachment to a suction inlet of the leaf blower for sucking leaves and debris into the container.

6. A bagger attachment for a leaf blower, the bagger attachment comprising:

a container having a bottom wall, a vertical wall, an open top and an inner volume dimensioned and configured for supporting a yard waste refuse bag, wherein the container further includes a platform pivotally mounted on the bottom wall of said container for pivoting the platform to remove the refuse bag when full of leaves and yard waste;

an opening formed in the vertical wall of the container;

a door mounted on the vertical wall the door movable between a closed position covering the opening formed in the vertical wall and an open position allowing access to the inner volume of the container;

a cover pivotally attached to the container, the cover adapted to close the open top and clamp a mouth of the refuse bag between the cover and the top of the container;

a filter opening defined in the cover;

a diffuser tube extending through the cover, the diffuser tube having a narrow diameter end extending above the cover, the narrow diameter end being adapted for snapping a leaf blower thereto, the diffuser tube having an opposite wide diameter end extending below the cover for reducing debris and air velocity of the debris and air blown into the container by the leaf blower when operated in vacuum mode with the cover in the closed position; and a filter disposed over the filter opening.

7. The bagger attachment according to claim 6, further including a hinge and counterweight attached to said cover and said container for pivotally attaching said cover to said container.

8. The bagger attachment according to claim 7, further comprising a counterweight attached to said cover adjacent the hinge for counterbalancing weight placed on said cover.

9. The bagger attachment according to claim 6, further including a wheeled cart, said container being supported on the wheeled cart.

10. A leaf blower with bagger attachment, comprising:

a container having a bottom wall, a vertical wall, an open top and an inner volume dimensioned and configured for supporting a yard waste refuse bag, wherein the container further includes a platform pivotally mounted on the bottom wall of said container;

an opening formed in the vertical wall of the container;

a door mounted on the vertical wall, the door being movable between a closed position covering the opening formed in the vertical wall and an open position allowing access to the inner volume of the container;

a cover pivotally attached to the container, the cover adapted to close the open top and support a mouth of the refuse bag clamped between the cover and the container;

a filter opening defined in the cover;

a diffuser tube extending through the cover, the diffuser tube having a narrow diameter end extending above the cover, the narrow diameter end being adapted for snapping a leaf blower thereto, the diffuser tube having an opposite wide diameter end extending below the cover for reducing debris and air velocity of the debris and air blown into the container by the leaf blower when operated in vacuum mode with the cover in the closed position;

a leaf blower having a suction conduit and an exhaust conduit, the exhaust conduit being removably mounted in the cover, the blower alternately being operable in blower and vacuum modes; and a filter disposed over the filter opening.

11. The leaf blower according to claim 10, including a flexible, lightweight, wire-wound hose attached to the suction conduit of said blower.

12. The leaf blower according to claim 10, wherein said exhaust conduit of said blower is removably mounted in the narrow diameter end of said diffuser tube.

13. The leaf blower according to claim 10, further including a hinge attached to said cover and said container for pivotally attaching said cover to said container.

14. The leaf blower according to claim 13, further including a counterweight attached to said cover adjacent said hinge for counterbalancing weight atop said cover.

15. The leaf blower according to claim 10, further including a wheeled cart, said container being supported on said wheeled cart.

16. The leaf blower according to claim 10, further comprising:

a hinge and counterweight attached to said cover and said container for pivotally attaching said cover to said container;

a platform pivotally mounted on the bottom wall of said container;

a pressure relief valve mounted in said cover; and a wheeled cart, said container being supported on said wheeled cart.

* * * * *